Dec. 8, 1942.   W. L. McGRATH   2,304,188
CONTROL APPARATUS
Filed June 16, 1941
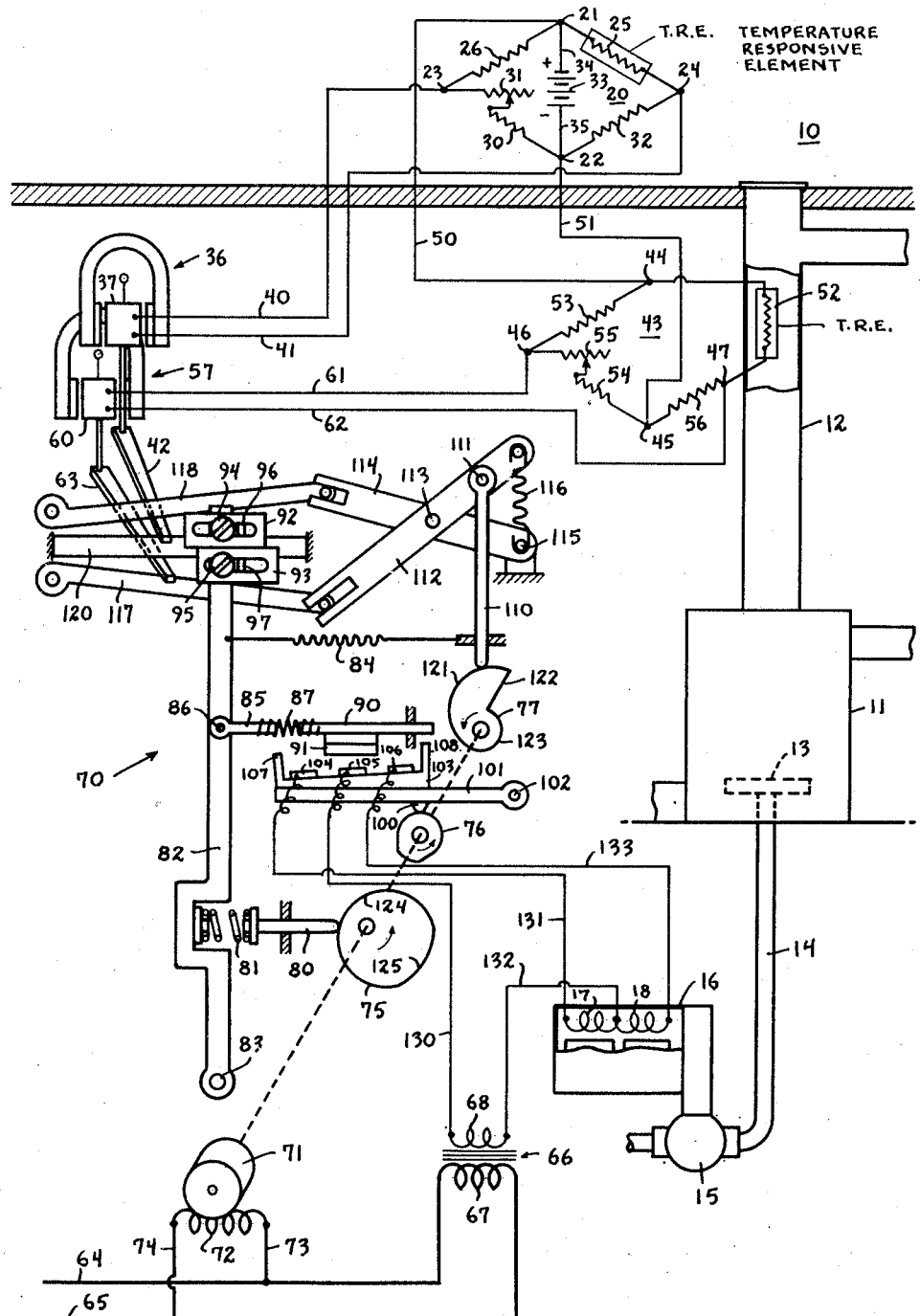
INVENTOR
William L. McGrath
BY
George H. Fisher
ATTORNEY Patented Dec. 8, 1942

2,304,188

UNITED STATES PATENT OFFICE 2,304,188

CONTROL APPARATUS

William L. McGrath, Philadelphia, Pa., assignor to Minneapolis-Honeywell Regulator Company, Minneapolis, Minn., a corporation of Delaware Application June 16, 1941, Serial No. 398,308

10 Claims. (Cl. 236—70)

This invention relates to control apparatus of the type in which the controlling effect is obtained from the position of the needle of a sensitive galvanometer.

An object of the invention is to provide an improved control system selectively responsive to one of a plurality of conditions, the selection depending upon the variation of those two conditions from their respective control points. Another object of the invention is to provide a control system operated in accordance with the relative positions of galvanometer pointers which are responsive to the controlling conditions.

A further object of the invention is to construct a control system responsive to the unbalance of a Wheatstone bridge circuit including a condition responsive resistance, wherein means responsive to a limiting condition is provided and control of the system is shifted from said bridge circuit to said limiting condition responsive means when the limiting condition exceeds a predetermined value. A further object is to provide such a system in which the limiting condition responsive means is another bridge circuit.

Another object of the invention is to provide an improved galvanometer-operated relay mechanism of the clamp-the-pointer type. A further object is to construct such a mechanism wherein two galvanometer pointers are simultaneously clamped, and one or the other of the pointers selectively controls the relay mechanism. A further object is to provide such a mechanism wherein the pointer which controls the relay is selected in accordance with the relative positions of the two pointers.

A further object of the invention is to provide a control system which is selectively responsive to one of two or more conditions, wherein means is provided for shifting control from one condition to another in accordance with the relative values of the conditions.

In condition control systems, and particularly in temperature control systems, it has long been known that a Wheatstone bridge circuit including a temperature responsive resistance element provided a very sensitive means for obtaining an indication of temperature changes. It has been desired to build a temperature control system including a Wheatstone bridge having a temperature responsive resistance as the sensitive element, and including a floating limit control device. By a floating limit control device is meant a device responsive to a limiting condition which acts to limit increase of the heat supply as the limiting condition approaches a predetermined value, and which acts to decrease the supply if the limiting condition exceeds the predetermined value. The application of floating limit control to Wheatstone bridge circuits in the past has involved the use of some kind of rheostat operated by a temperature sensitive element. Such rheostats have been generally unsatisfactory because of the irregular resistance variation due to the low contact pressures necessary when the contacts are moved by low-powered temperature sensitive elements. The use of condition responsive elements, such as temperature responsive resistors, for limit controls in bridge circuits has been considered undesirable because their effect on the bridge circuit was always present, unless switching means were provided for disconnecting them at predetermined times. When no such switching means was used, the limiting condition caused bad unbalancing effects on the system due to its variations when it was not near its limiting value. On the other hand, when switching means was used, the irregular variations of the contact resistance caused trouble.

It is therefore a further object of this invention to construct a control system in which the principal condition responsive element is a temperature responsive resistance, and in which a floating limit control is obtained from a second temperature responsive resistance.

Other objects and advantages of the present invention will become apparent from a consideration of the attached specification, claims, and drawing.

The single figure of the drawing shows a diagrammatic view of a control system embodying my invention.

In the drawing, 10 represents a space which is heated by a furnace 11, shown, by way of example, as being of the hot air type. Air is delivered from the furnace 11 to the space 10 through an outlet duct 12.

The furnace 11 is provided with a fluid fuel burner 13, to which fuel is supplied through a pipe 14 provided with a valve 15. The valve 15 is operated by a driving mechanism generally indicated at 16 which includes an electrical motor having a pair of windings 17 and 18. It should be readily understood that the present illustration is by way of example only, and that the present invention is equally adaptable to other types of furnaces burning different kinds of fuel. The windings 17 and 18 are so related to the operating mechanism 16 that they drive the valve in opposite directions. For example, if energization of the winding 17 causes movement of the valve in opening direction, then energization of the winding 18 causes movement of the valve in closing direction.

A bridge circuit 20 is provided having input terminals 21 and 22, and output terminals 23 and 24. In the upper right-hand arm of the bridge 20 is a resistance element 25 having an appreciable temperature coefficient of resistance and exposed to the temperature in the space 10.

The upper left arm of the bridge, which connects terminals 21 and 23, contains a fixed resistance 26. The lower left arm of the bridge circuit 20, which connects input terminal 22 with output terminal 23, contains a fixed resistance 30 and a variable resistance 31. By adjustment of resistance 31, the temperature at which bridge 20 is balanced may be fixed at any desired value. The lower right arm of the bridge 20, which connects input terminal 22 with output terminal 24, contains a fixed resistance 32.

Energy is supplied to the bridge circuit 20 from a suitable source, shown in the drawing as a battery 33, connected to the input terminals 21 and 22 through conductors 34 and 35, respectively.

A galvanometer 36 is provided, having a moving coil 37, connected to output terminals 23 and 24 of bridge circuit 20 through conductors 40 and 41, respectively. The galvanometer 36 has a pointer 42, normally biased to a central position, which may be the position shown in the drawing, and deflectable from that position by a current flowing through the coil 37. The pointer 42 indicates the unbalance potential of the bridge circuit 20, and thereby the departure of the temperature to which the element 25 is exposed from a value predetermined by the setting of the variable resistance 31.

A bridge circuit 43 has input terminals 44 and 45 and output terminals 46 and 47. The input terminals 44 and 45 are connected to the same source of electrical energy which supplies bridge circuit 20, that is, the battery 33, by conductors 50 and 34, and conductors 51 and 35, respectively.

The upper right arm of the bridge circuit 43, which connects input terminal 44 with output terminal 47, contains an element 52 having an appreciable temperature coefficient of resistance. The element 52 is exposed to the temperature of the air in the discharge duct 12 near the point where it leaves the furnace 11.

The upper left arm of the bridge circuit 43, which connects input terminal 44 with output terminal 46, contains a fixed resistance 53. The lower left arm of the bridge circuit 43, which connects input terminal 45 with output terminal 46, contains a fixed resistance 54 and a variable resistance 55. The function of variable resistance 55 is to determine the temperature at which the bridge 43 is balanced. The lower right arm of the bridge circuit 43, which connects input terminal 45 with output terminal 47, contains a fixed resistance 56.

A galvonometer 57 has a moving coil 60, which is connected to output terminals 46 and 47 by conductors 61 and 62, respectively. The moving coil 60 operates a pointer 63. The pointer 63 is deflected from a central position to which it is biased in accordance with the unbalance potential of bridge circuit 43. This unbalance potential is proportional to the variation of the temperature to which element 52 is exposed from a predetermined value which is fixed by the setting of the variable resistance 55.

Energy is supplied to the windings 17 and 18 of the driving mechanism 16 from power supply lines 64 and 65 through a transformer 66 having a primary winding 67 and a secondary winding 68. The energization of windings 17 and 18 is controlled by a sensitive relay mechanism generally indicated at 70, which is driven by a constantly rotating motor 71 having a winding 72 connected to power lines 64 and 65 through conductors 73 and 74, respectively. The motor 71 drives, through suitable mechanical connections (not shown), series of three cams, 75, 76 and 77.

The cam 75 drives, through a follower 80, and a strain release spring 81, a switch positioner arm 82. The arm 82 is pivoted for rotation about its lower extremity, as at 83. A spring 84 biases the arm 82 for rotation about the pivot 83 in a clockwise direction, thereby maintaining the follower 80 in engagement with the cam 75. A link 85 is pivoted as at 86, to an intermediate point on the arm 82. The link 85 is connected through a strain release spring 87 to a reciprocable supporting member 90 which carries on its underside a switch contact 91.

A pair of plates 92 and 93 are adjustably attached to the upper end of the arm 82 by means of screw and slot connections 94 and 95 respectively. A pair of upstruck ears 96 and 97 on the arm 82 extend through the slots of these connections so as to guide the movement of the plates 92 and 93 in a direction transverse to the length of arm 82, when the plates are being adjusted. The plates 92 and 93 are mounted one above the other in such relation that as the arm 82 is reciprocated, plate 92 moves transversely to the path of galvanometer pointer 42, while plate 93 moves transversely to the path of movement of galvanometer pointer 63.

The cam 76 operates against a follower 100 on a switch contact supporting arm 101 which is pivoted at its righthand end 102. The arm 101 carries an insulating block 103 on which are mounted three contacts 104, 105 and 106. The ends of the block 103 are provided with upstanding projections 107 and 108, which extend into the path of movement of contact 91 and limit its movement transversely to the contacts 104, 105 and 106.

Cam 77 operates a follower link 110, the upper end 111 of which is pivoted to a scissors link 112. The link 112 is pivoted at 113 to another scissors link 114, the right-hand end of which is pivoted to a stationary support, as at 115. A tension spring 116 joins the right-hand end of the scissors links 112 and 114. The spring 116 tends to cause the scissors links to close toward each other. The left-hand end of scissors links 112 and 114 are provided with slots which receive pins attached to the ends of beater arms 117 and 118, respectively.

A horizontal bar 120 extends between the galvanometer pointers 42 and 63. Operation of the cam 77 acts through the scissors links 112 and 114 to reciprocate the beater arms 117 and 118 so as to clamp the galvanometer pointers 63 and 42 respectively against the horizontal bar 120.

*Operation*

The operation of the system will first be described as though the galvanometer 57 were omitted and the valve 15 were operated in accordance with the unbalance of the bridge circuit 20 acting through the galvanometer 36.

When the temperature in the space 10 is at the value which the system has been set to maintain by adjustment of the resistance 31, the bridge circuit 20 is balanced and no current flows through the galvanometer coil 37. The pointer 42 will therefore be in its normal or intermediate position. The valve 15 is at this time in such a position that the heat supplied by the furnace 11 to the space 10 is just sufficient to balance the heat loss from the space, and the space is therefore maintained at the desired temperature.

As the motor 71 rotates the cam 77 moves in a counterclockwise direction. This cam 77 has a relatively long riser portion 121, an abrupt drop-off portion 122, and a low dwell portion 123. When the parts are in the position shown in the drawing, the follower 110 is near the top of the riser portion 121, and the beater arm 118 has been moved away from the pointers 42 and 63. As the drop-off portion 122 passes under the follower 110, the latter drops downwardly under the influence of the spring 116, thereby closing the scissors and bringing the beater arm 118 downwardly to clamp the pointer 42 against the horizontal bar 120. The pointer 42 remains clamped while the follower 110 is engaging the dwell portion 123 of the cam 77. When the follower 110 engages the riser portion 121, the beater arm 118 is lifted from the pointer 42, and the latter is again allowed to move freely under the influence of the coil 37.

While the follower 110 is engaging the dwell portion 123 and the pointer 42 is therefore clamped, the cam 75 operates against the follower 80 to move the arm 82 to the left. This movement of the arm 82 continues until the plate 92 engages the pointer 42. When this engagement takes place, further movement of the arm 82 to the left is prevented, and further movement of the cam follower 80 in that direction is taken up by the strain release spring 81. The cam 75 is provided with a surface portion 124 which is eccentric with respect to the center of rotation of the cam 75 and a second portion 125 which is concentric with the center of rotation of cam 75. The eccentric portion 124 serves to cause reciprocation of the arm 82, while the concentric portion 125 maintains the arm 82 at the left-hand end of its range of movement, or in the position in which it is stopped by engagement of plate 92 with pointer 42.

While the arm 82 is maintained in its stopped position by the cam 75, the cam 76 operates against the follower 100 to lift the switch contacts 104, 105 and 106 so that one or more of them engages the switch contact 91. The position of switch contact 91 at this time depends upon the position in which the arm 82 has been stopped. If the arm 82 is stopped in its position corresponding to the center position of pointer 42, then contact 91 is in its corresponding center position, and upon the lifting of the contacts 104, 105 and 106, only the contact 105 engages the contact 91. No circuit is then completed to either winding 17 or 18 of the valve operating mechanism 16, and the setting of the valve 15 is left undisturbed.

Now let it be assumed that the temperature in the space 10 falls below the value which the system has not been set to maintain. If it is considered that the element 25 has a positive temperature coefficient of resistance, then the drop in temperature of the space 10 will cause a decrease in the resistance of the element 25. If the polarity of the battery 73 is assumed to be that shown by the legend in the drawing, this decrease in resistance of the element 25 causes the potential of output terminal 24 to become positive with respect to that of output terminal 23. A current therefore flows from terminal 24 to terminal 23 through conductor 41, coil 37 and conductor 40.

This current flowing through the coil 37 causes the pointer 42 to be deflected to the left. On the next reciprocation of the arm 82, the plate 92 engages the pointer 42 at a point to the left of its center position. If the deflection of pointer 42 is large enough, the arm 82 is stopped at a position far enough to the left so that switch contact 91 is in line with both contacts 104 and 105 when they are next raised by the operation of cam 76. If this is the case, engagement of contact 91 with contacts 104 and 105 completes a circuit through winding 17 of valve operating mechanism 16. This circuit may be traced from the left-hand end of transformer secondary winding 68 through a conductor 130, contact 105, contact 91, contact 104, a conductor 131, winding 17, and a conductor 132 to the right-hand end of secondary winding 68. Energization of winding 17 causes motor 16 to drive the valve 15 in opening direction, thereby increasing the supply of heat to the space 10 and tending to return the temperature of that space to its desired value. The winding 17 continues to be intermittently energized by engagement of contact 91 with contacts 104 and 105 as long as the pointer 42 is deflected to a position far enough to the left of its central position so that the contact 91 is moved far enough to the left to engage contact 104.

Now let it be assumed that the temperature in the space 10 rises above the value which the system has been set to maintain. This increase in temperature results in an increase in the resistance of the element 25, thereby causing the potential of output terminal 24 to become negative with respect to that of output terminal 23. A current therefore flows from terminal 23 to terminal 24 through conductor 40, coil 37, and conductor 41. This current flows through the galvanometer coil 37 in a direction opposite to the current caused by a temperature drop, and therefore causes pointer 42 to be deflected to the right of its center position. Accordingly, the arm 82 is stopped by engagement of plate 92 with pointer 42 at a position to the right of its center position. If the deflection of pointer 42 is great enough the contact 91 is stopped in line with both contacts 105 and 106.

Upon engagement of contact 91 with contacts 105 and 106 an energizing circuit is completed for winding 18 of operating mechanism 16. This circuit may be traced from the left-hand end of secondary winding 68 through conductor 130, contact 105, contact 91, contact 106, a conductor 133, winding 18, and conductor 132, to the right-hand end of stationary winding 68.

Energization of winding 18 will cause operating mechanism 16 to drive the valve 15 in closing direction, thereby reducing the amount of heat supplied to the space 10 by the furnace 11. As long as the pointer 42 is deflected to the right, thus indicating that the temperature in the space 10 is above the desired value, the winding 18 is intermittently energized, thereby reducing the supply of heat to the space 10.

Projections 107 and 108 are provided to limit the movement of contact 91 when the galvanometer is deflected to one of its extreme positions. Because of these projections, the contact 91 may not move to such a position that it engages only contact 104 or contact 106. If these stops were omitted, an extreme deflection of the galvanometer might cause contact 91 to move to such a position, thereby preventing operation of the motor at a time when its operation was needed most. When contact 91 engages stop 107 or 108, further movement of arm 82 in either direction is permitted by strain release spring 87.

The operation of the system with both galvanometers 36 and 57 will now be considered. The function of the bridge circuit 43 and the galvanometer 57 is to cut down the supply of fuel to the furnace when the resistance of the element 52 is such as to indicate that the temperature of the air discharged from the furnace is becoming dangerously high.

The limiting value of the discharge duct temperature, above which it is desired that the fuel supplied to the furnace be reduced regardless of the temperature in the space 10, may be determined for any particular system by means of the variable resistance 55. The system normally operates so that the discharge duct temperature is below that value. At such a time the resistance of element 52 is lower than that required to balance the bridge 43. The potential of output terminal 47 is therefore more positive than that of output terminal 46 and a current is flowing from terminal 47 to terminal 46 through conductor 62, coil 60 and conductor 61.

This current flowing through the coil 60 causes a deflection of pointer 63 to the left of its central position. As the normal discharge duct temperature is considerably below the limiting temperature, the bridge 43 is normally considerably unbalanced, and the pointer 63 is deflected considerably to the left of its central position. The pointer 63 is therefore, usually further to the left than the pointer 42, and the latter pointer is the first one engaged by the arm 82 as it moves to the left. The normal system operation is therefore that described in the preceding paragraphs, where it was considered that the galvanometer 57 was omitted.

If the temperature in the discharge duct 12 rises to its predetermined limiting value, the bridge 43 is balanced and the pointer 63 moves to its central position. On the next movement of the arm 82 to the left, the pointer 63 prevents any further opening movement of the valve 15. If the pointer 42 is at the left of its center position, thus indicating a call for heat due to temperature in the space 10, the plate 93 engages the pointer 63 before the plate 92 engages the pointer 42. The position of the contact 91 now depends on the position of pointer 63 rather than the position of pointer 42 and since the pointer 63 is in its center position, neither winding 17 nor 18 is energized. Therefore, no additional supply of fuel to the burner is permitted. If, however, the temperature in the space 10 is above its normal value so that pointer 42 is deflected to the right, the pointer 63 has no effect on the operation of the mechanism and the switch contact 91 is positioned in accordance with the pointer 42 so as to engage contacts 105 and 106 and energize winding 18 to drive the valve 15 towards closed position.

If the temperature in the discharge duct 12 increases above the limiting value which was set by the resistance 55, the resistance of element 52 increases so that the potential of output terminal 47 becomes more negative than that of terminal 46. A current therefore flows from terminal 46 to terminal 47 through conductor 61, coil 60 and conductor 62. This current flowing through coil 60 causes a deflection of pointer 63 to the right of its normal position. When the arm 82 next moves to the left the plate 93 engages the pointer 63, thereby setting the position of contact 91 to the right of its normal position so that contacts 105 and 106 both engage contact 91 when the contacts 105 and 106 are lifted. This closes the energizing circuit described above for winding 18 of valve operating mechanism 16, so that the valve 15 is driven towards closed position. Under these conditions, the valve is driven towards closed position regardless of the position of pointer 42. If the pointer 42 happens to be further to the right than pointer 63, the valve would be driven towards closed position anyway. If the pointer 42 was at the same relative position as pointer 63 or further to the left than pointer 63, then the position reached by arm 82 would be controlled by pointer 63, and the valve 15 would be driven towards closed position as described above.

The plates 92 and 93 are made adjustable with respect to the arm 82 so that variations in the neutral positions of the galvanometer pointers may be taken care of.

While I have shown and described a preferred embodiment of my invention, modifications of this structure will readily occur to those skilled in the art, and it should be understood that I wish to be limited only by the scope of the appended claims.

I claim as my invention:

1. A condition control system, comprising in combination, condition changing means, a first electrical bridge circuit including an impedance variable in accordance with the magnitude of a condition indicative of the need for operation of said condition changing means, a first galvanometer having a pointer and connected to said first bridge circuit so as to respond to an unbalance potential thereof, a second electrical bridge circuit including an impedance variable in accordance with the magnitude of a limiting condition, a second galvanometer having a pointer and connected to said second bridge circuit so as to respond to an unbalance potential thereof, control means for said condition changing means, operating means variable in position to vary the effect of said control means on said condition changing means, and means for positioning said operating means in accordance with the position of one of said pointers, said positioning means selecting said one pointer in accordance with the relative positions of said pointers.

2. A condition control system, comprising in combination, condition changing means, a first electrical bridge circuit, including an impedance variable in accordance with the magnitude of a condition indicative of the need for operation of said condition changing means, means responsive to the unbalance of said first bridge circuit including a first member variable in position in accordance therewith, a second electrical bridge circuit including an impedance variable in accordance with the magnitude of a limiting condition, means responsive to the unbalance of said second bridge circuit including a second member variable in position in accordance therewith, means for controlling said condition changing means, operating means variable in position to vary the effect of said control means on said condition changing means, and means for positioning said operating means in accordance with the position of one of said members, said lastnamed means selecting said one member in accordance with the relative positions of said members.

3. A control system, comprising in combination, a pair of galvanometers having movable pointers, said pointers moving in parallel planes, means for deflecting one of said pointers in accordance with the value of one of a pair of controlling conditions, means for deflecting the other pointer in accordance with the value of the other controlling condition, means for simultaneously clamping said pointers, a positioner member movable along a path transverse to the paths of movement of said pointers, said positioner member being stopped upon engagement with one of said clamped pointers, a switch arm positioned by said member, a pair of contacts selectively engageable with said arm, the particular contact engaged depending on the position of said arm, and a pair of control circuits each including one of said contacts.

4. A control system, comprising in combination, a pair of galvanometers having movable pointers, said pointers moving in parallel planes, means for deflecting one of said pointers in accordance with the value of one of a pair of controlling conditions, means for deflecting the other pointer in accordance with the value of the other controlling condition, means for simultaneously clamping said pointers, a positioner member movable along a path transverse to the paths of movement of said pointers, said positioner member being stopped upon engagement with one of said clamped pointers, and control means operable in accordance with the position of said member.

5. In a control system, in combination, a pair of galvanometers having movable pointers, said pointers moving in parallel planes, means for simultaneously clamping said pointers, a positioner bar spanning the distance between the planes of movement of said pointers, said positioner bar being movable along a path transverse to said planes, means for moving said bar along said path until it is stopped by engagement with one of said pointers, and control means operable in accordance with the position in which said bar is stopped.

6. In a control system, in combination, a pair of galvanometers having movable pointers, said pointers moving in parallel planes, means for simultaneously clamping said pointers, including a stationary bar mounted between said pointers and extending parallel to their planes of movement, a pair of movable bars, each supported on the opposite side of one of said pointers from said stationary bar, and means for simultaneously moving said pair of bars towards said stationary bar so as to clamp said pointers therebetween, a positioner member movable along a path transverse to the path of movement of said pointers, means for moving said member along said path until it is stopped by engagement with one of said pointers, and control means operable in accordance with the position in which said member is stopped.

7. In a control system, in combination, a pair of galvanometers having movable pointers, said pointers moving in parallel planes, means for simultaneously clamping said pointers, a positioner bar spanning the distance between the planes of movement of said pointers, said positioner bar being movable along a path transverse to said planes, a pair of members mounted on said bar, each member being adapted to engage one of said pointers, means for separately adjusting said members with respect to said bar, means for moving said bar along said path until it is stopped by engagement of one of said members with its associated pointer, and control means operable in accordance with the position in which said member is stopped.

8. In a condition control system, in combination, a first galvanometer having a first pointer, means for positioning said pointer in accordance with the magnitude of a first condition, a second galvanometer having a second pointer, means for positioning said second pointer in accordance with the magnitude of a second condition, condition controlling means, operating means variable in position to vary the effect of said condition controlling means, and means for positioning said operating means in accordance with the position of one of said pointers, said positioning means selecting said one pointer in accordance with the relative positions of said pointers.

9. A condition control system, comprising in combination, an electrical network including a first condition responsive impedance, means responsive to a potential of said network indicative of the magnitude of said condition including a first galvanometer having a pointer, a second condition responsive impedance in said network variable in accordance with a limiting condition, means responsive to a potential of said network indicative of the magnitude of said limiting condition including a second galvanometer having a pointer, condition controlling means, operating means variable in position to vary the effect of said condition controlling means, and means for positioning said operating means in accordance with the position of one of said pointers, said positioning means selecting said one pointer in accordance with the relative positions of said pointers.

10. In a control system, in combination, a pair of galvanometers having movable pointers, means for simultaneously clamping said pointers, a positioner bar movable along a path transverse to the paths of both said pointers, means for moving said bar along its path until it is stopped by engagement with one of said pointers, and control means operable in accordance with the position in which said bar is stopped.

WILLIAM L. McGRATH.